United States Patent [19]

Pownall

[11] Patent Number: 5,980,817
[45] Date of Patent: Nov. 9, 1999

[54] RELATING TO PRESS HEADS AND DROSS PRESSING APPARATUS

[75] Inventor: Michael Pownall, Nottingham, United Kingdom

[73] Assignee: J. McIntyre (Machinery) Limited, United Kingdom

[21] Appl. No.: 09/122,387

[22] Filed: Jul. 24, 1998

[30] Foreign Application Priority Data

Jul. 24, 1997 [GB] United Kingdom .................. 9715541

[51] Int. Cl.$^6$ .................................................. C22B 7/00
[52] U.S. Cl. .......................................... 266/205; 266/227
[58] Field of Search .................................... 266/205, 227, 266/201

[56] References Cited

U.S. PATENT DOCUMENTS

| | | | |
|---|---|---|---|
| 4,057,232 | 11/1977 | Ross et al. | 266/227 |
| 4,540,163 | 9/1985 | Van Linden et al. | 266/201 |
| 5,397,104 | 3/1995 | Roth | 266/227 |
| 5,811,056 | 9/1998 | Bramley | 266/205 |

*Primary Examiner*—Scott Kastler
*Attorney, Agent, or Firm*—Reese Taylor

[57] ABSTRACT

The design of the press head includes concave profile sides to enable a greater amount of aluminium dross to be trapped in a skim box as the press head descends. The end of the head forms a spike which can pass through a central hole in the skim box to clear the hole allowing free drainage of molten aluminium.

8 Claims, 3 Drawing Sheets

RELATING TO PRESS HEADS AND DROSS PRESSING APPARATUS

The present invention relates to a press head for dross processing apparatus.

Dross processing apparatus is known from PCT patent application No. WO 96/32514 to the same applicant.

In such apparatus dross is tipped into a skim box and is then pressed by a press head which is hydraulically driven towards the skim box. The skim box comprises at least one hole in the bottom of the skim box through which molten aluminium flows into a sow mould.

The press head normally cycles through a plurality of pressing operations which both squeeze additional aluminium from the dross and also serve to cool the dross to enable it to be tipped out of the skim box without excessive flexing which wastes aluminium.

A problem which has been identified by the inventors is that skim boxes are often filled by operators to above an acceptable level in order to process aluminium dross as quickly as possible. In known designs of skim box and press head using hemispherical head designs it is only possible to fill the skim boxes to, for example, less than half full because once the head descends the dross overflows the skim box by virtue of the head pressure.

It is an object of the present invention to provide a dross press head which obviates the above problem, enabling the skim box to be filled to a greater extent and thereby enabling a substantially greater throughput of dross.

Because of the greater amount of dross which may be placed in the skim box it is advantageous to be able to cool the head.

The present invention therefore provides a press head for a dross press, the press head comprising in at leat one vertical cross section an inverted conical shape having a concave external surface.

In a preferred embodiment the head shape comprises a cone with all vertical cross sections being substantially identical and all having a concave external surface.

In this preferred embodiment the head shape is circular at the uppermost end and tapers in a concave arcuate shape to a substantially narrow cross section at the lowermost end, said substantially narrow cross section being substantially circular in shape.

The substantially narrower cross section portion at the lowermost end forms in a preferred embodiment a spike (or marl punch) which cooperates with a suitably sized hole in the skim box.

The skim box is in a preferred embodiment generally hemispherical in internal shape.

In a further embodiment the head shape is oval providing a generally conical shape, the cross section of which varies but which provides a concave external surface over the majority of the external surface.

The oval head shape cooperates with a generally oval shaped skim box.

BRIEF DESCRIPTION OF THE DRAWINGS

Embodiments of the present invention will now be described, by way of example with reference to the accompanying drawings in which.

Figure 1:
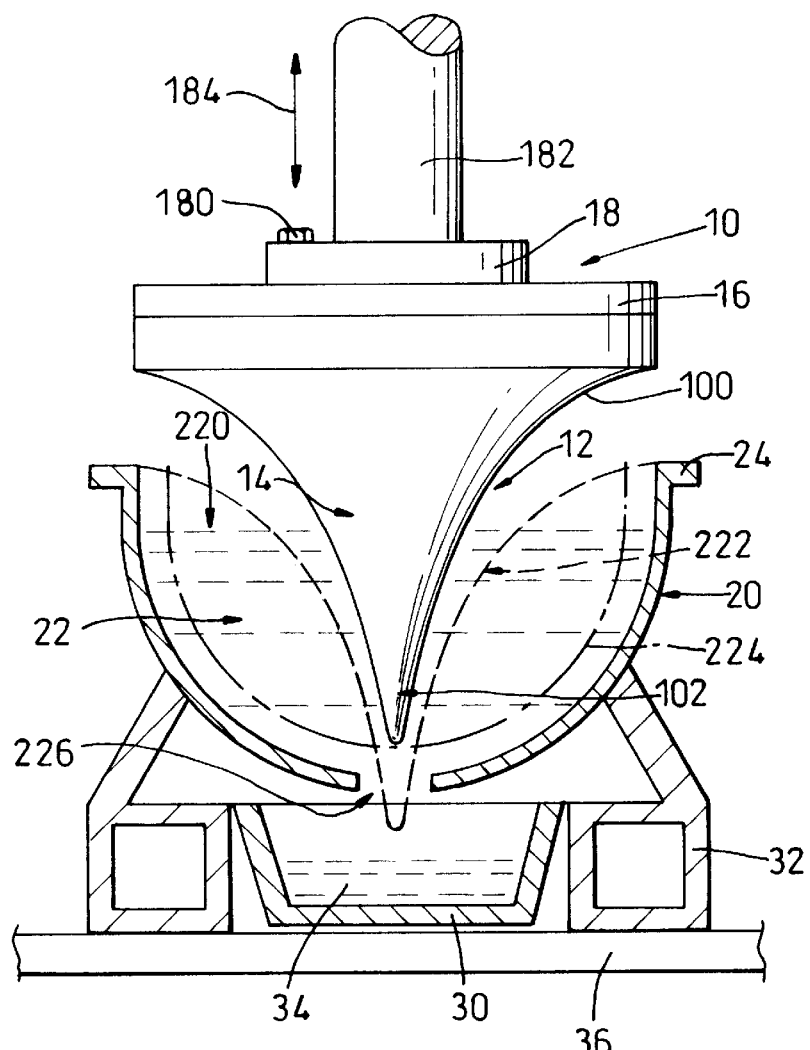
FIG. 1 shows in partial cross sectional elevation a press head skim box and sow mould in accordance with a first embodiment of the present invention.
Figure 2:
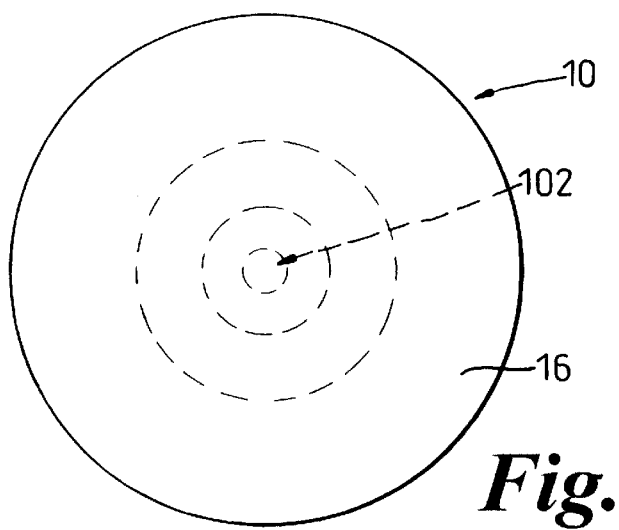
FIG. 2 schematically shows the head of FIG. 1 in plan view.

With reference now to FIGS. 1 and 2, a press head 10 is shown which cooperates with a skim box 20 and sow mould 30.

The dross press is operated in accordance with known processes and also comprises a cabinet and controls such as shown in PCT Applications Nos. WO96/32513, WO96/32514 and WO96/32515 to the same applicant, the description therein being incorporated herein by way of explanation.

The press head 10 comprises a generally conical shaped lower portion 12 which is shaped to define a cylindrical concave surface 14. In this embodiment all vertical cross sections through the press head 10 will be substantially identical.

The upper portion of the press head is attached to a support which comprises a plate 16 and collar 18 attached, for example, by a plurality of bolts 180 (only one shown) to a ram 182 which is operative to move the head 10 as shown in the direction of arrows 184.

Skim box 20 is designed to accommodate dross 22 and may be filled to a higher level 220 than normal as now explained.

Because the head shape is concave, the head, when it descends, will tend to trap the dross within the skim box 20 forming a shape as indicated by dotted line 222. As can be seen, this enables a larger bulk of dross to be contained within the skim box 20 without spilling over the upper lip 24. The difference is clear when compared with chain dotted line 224 which shows the shape which would be produced by a hemispherical head. As can be seen by chain dotted curve 224, the volume of dross which can be pressed is substantially less for a hemispherical head and also the tendency to spill over the rim 24 is much greater. For this reason the operators tend to fill the skim boxes to less than half full to overcome this problem.

The concave design of head therefore has two distinct advantages. It allows more dross to be pressed by increasing the available volume between the head and the side of the skim box. It also serves, by virtue of the shape of the upper portion of the head as indicated at 100, to trap the dross within the skim box.

The skim box is mounted in known manner on a frame 32 into which the sow mould 30 fits and is transported with the combined skim box and frame 32. Molten aluminium 34 drains into the sow mould 30 through a hole 226 in the skim box 20. The frame 32 sits on the floor 36 of the dross press, floor 36 being only partially shown.

Because the head 10 is designed with a concave face, the end portion 102 forms a spike or marl punch which, when the head descends to its lowest level as indicated by dotted lines 222, passes through the hole 226 which is dimensioned to accept the punch, to thereby clear the hole 226.

Spikes have been previously added to press heads such as in U.S. Pat. No. 4,540,163 (van Linden) but these tend to be welded on additions. By using the present head design the spike is an integral part of the head and therefore not subject to cracking of any weld.

The shape of the head 10 is shown schematically in plan view in FIG. 2 showing spike 102.

Figure 3:
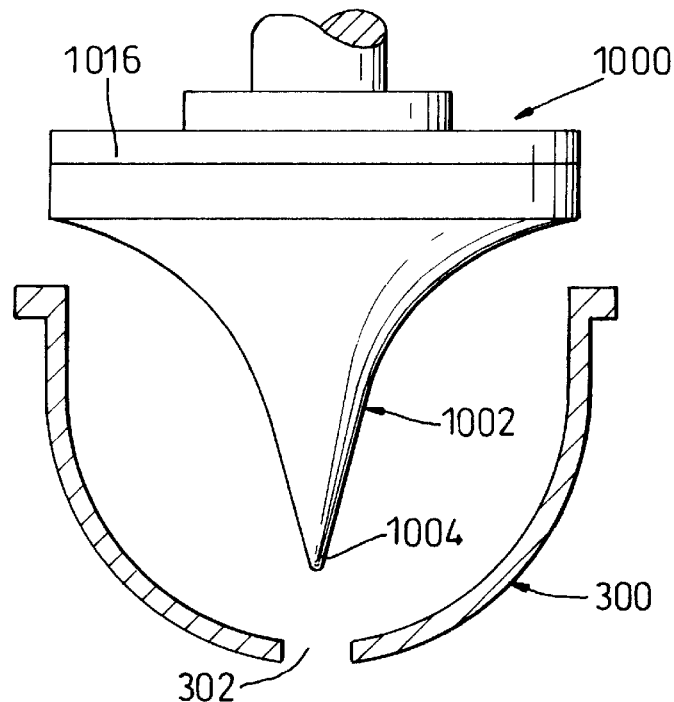
FIG. 3 shows in partial cross sectional elevation a press head and skim box according to a second embodiment of the present invention.
Figure 4:
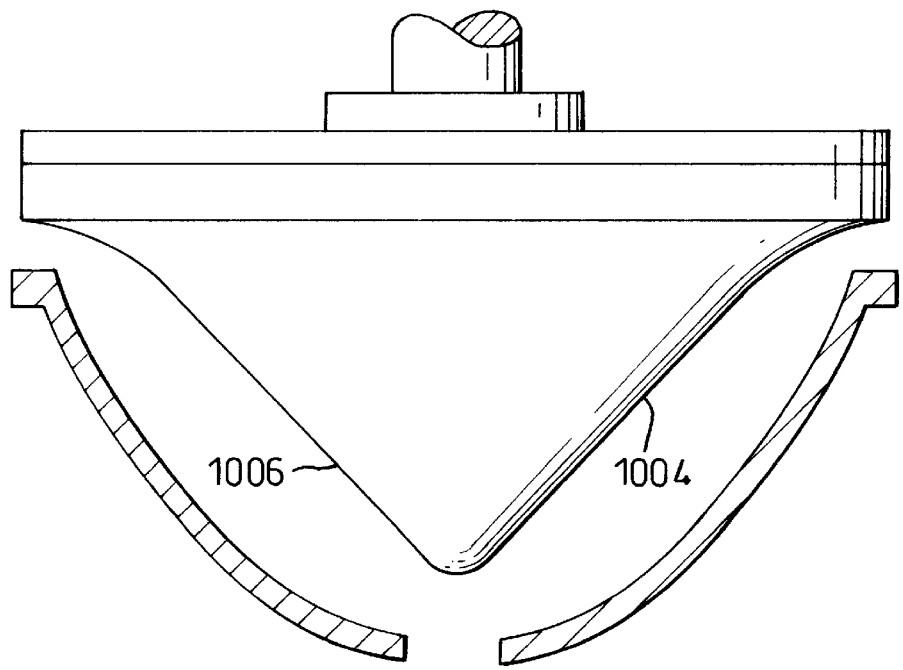
FIG. 4 shows the head and skim box of FIG. 2 in partial cross sectional elevation from a different angle.
Figure 5:
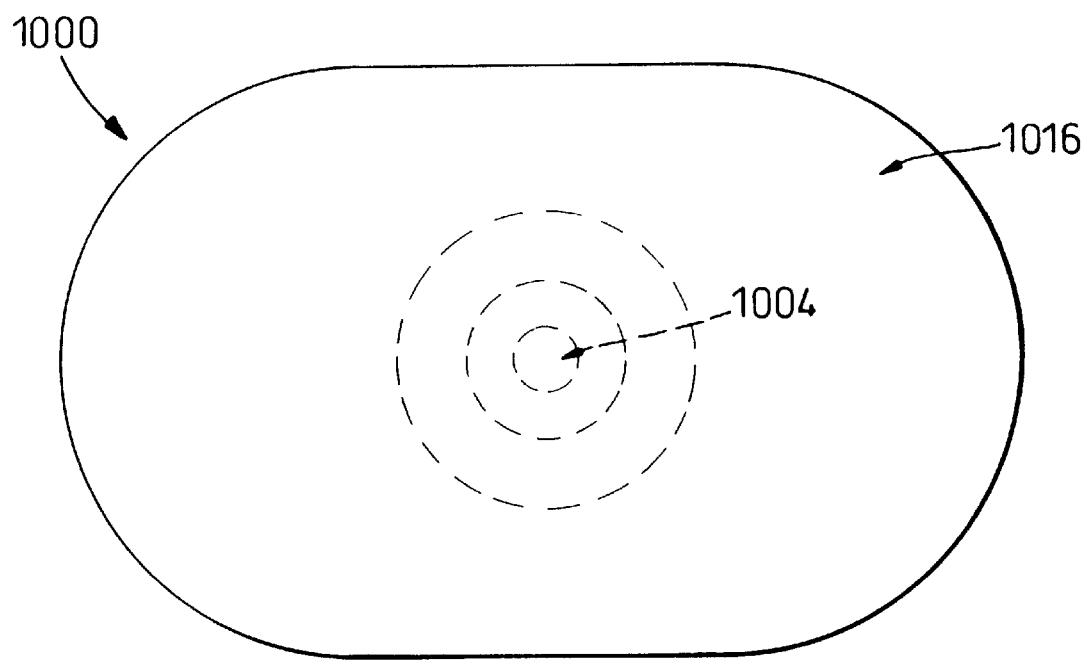
FIG. 5 shows the schematically the head of FIGS. 3 and 4 in plan view.

With reference now to FIGS. 3 to 5, an alternative head and skim box design is shown. The frame 32 and sow mould 30 are not shown but will be designed to be of suitable size and shape to cooperate with the head and skim box size and shape and are considered to be within the competence of the skilled engineer to design these once the size and shape of the head and skim box have been determined. As in FIGS. 1 and 2, the size of the head and skim box will be to a large extent dictated by the capacity of the press, e.g. 250 Kg, 500 Kg, 750 Kg or 1000 Kg loads.

In FIGS. 3 to 5 the head 1000 is of oval design. On two of its "sides" the head shape 1002 is concave (FIG. 3) with a smooth curved shape leading to substantially straight sided end structures 1004, 1006, as shown in FIG. 4.

Referring specifically to FIG. 3 it may be seen by comparison with FIG. 1 that the head of FIG. 3 has the same general shape and therefore has the same advantages as the head of FIG. 1 but with the advantage that the skim box 300 can be larger due to its oval shape. The head 1000 is shown schematically in plan view to illustrate the oval shape. The head 1000 is, as in FIG. 1, shaped to provide a spike or marl punch 1004 which cooperates with the drainage hole 302 in the skim box 3000 and serves to provide free passage through the drainage hole for the molten aluminium at each rise and fall movement of the head.

What is claimed is:

1. A press head for a dross press, the press head comprising in at least one vertical cross section an inverted conical shape having a concave external surface.

2. A press head as claimed in claim 1 in which the head shape comprises a cone with all vertical cross sections being substantially identical and all having a concave external surface.

3. A press head as claimed in claim 1 in which the head shape is circular at the uppermost end and tapers in a concave arcuate shape to a substantially narrow cross section at the lowermost end, said substantially narrow cross section being substantially circular in shape.

4. A press head as claimed in claim 2 in which a skim box having a hollow, substantially concave interior is positioned for receipt of said press head; and the substantially narrower cross section portion at the lowermost end of said press head forms in a spike which cooperates with a suitably sized hole in said skim box.

5. A press head for a dross press as claimed in claim 1 and a cooperating skim box in which the skim box is generally hemispherical in internal shape.

6. A press head as claimed in claim 1 in which the head shape is oval providing a generally conical shape, the cross section of which varies but which provides a concave external surface over the majority of the external surface.

7. A press for dross incorporation a press head as claimed in claim 6 and a skim box in which the oval head shape cooperates with a generally oval shaped skim box.

8. A press head and a cooperating skim box for use with a dross pressing apparatus, comprising:

a press head having a concave external surface; and a skim box having a generally hemispherical internal shape.

\* \* \* \* \*